US009577987B2

(12) United States Patent
Faith et al.

(10) Patent No.: US 9,577,987 B2
(45) Date of Patent: Feb. 21, 2017

(54) DIGITAL BROADCAST METHODS USING SECURE MESHES AND WAVELETS

(71) Applicant: Visa International Service Association, San Francisco, CA (US)

(72) Inventors: Patrick Faith, Pleasanton, CA (US); Theodore D. Harris, San Francisco, CA (US); Scott Edington, Arlington, VA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/058,162

(22) Filed: Oct. 18, 2013

(65) Prior Publication Data

US 2014/0115338 A1    Apr. 24, 2014

Related U.S. Application Data

(60) Provisional application No. 61/716,442, filed on Oct. 19, 2012.

(51) Int. Cl.
*H04N 21/2347* (2011.01)
*H04L 29/06* (2006.01)
(Continued)

(52) U.S. Cl.
CPC ............ *H04L 63/0428* (2013.01); *H04L 67/22* (2013.01); *H04N 1/4486* (2013.01); *H04N 21/23412* (2013.01); *H04N 21/23476* (2013.01)

(58) Field of Classification Search
CPC ............ H04N 7/1675; H04N 21/23476; H04N 21/2347; H04N 2005/91364; H04N 21/44055; H04N 5/913; H04N 21/4405; H04N 1/4486; H04N 21/234327; H04N 21/4516; H04N 1/448; H04N 21/2662; H04N 21/23418; H04N 21/23412; H04L 63/0428
(Continued)

(56) References Cited

U.S. PATENT DOCUMENTS 6,678,378 B1 *   1/2004   Akiyoshi ................ G06T 19/20
                                                                380/202
7,159,112 B1 *   1/2007   Williams ................ G06F 21/84
                                                                 380/54
(Continued)

FOREIGN PATENT DOCUMENTS

KR    10-2007-0076130 A    7/2007
WO        2007/015133 A2    2/2007

OTHER PUBLICATIONS

International Search Report and Written Opinion mailed Jan. 28, 2014 in PCT/US2013/065470, 10 pages.
(Continued)

*Primary Examiner* — Tae Kim
(74) *Attorney, Agent, or Firm* — Kilpatrick Townsend & Stockton LLP (57) ABSTRACT

Methods and apparatuses are presented for securely providing digital streaming data to subscriber devices using encrypted wavelet meshes. A recorded image may be subdivided into three sources of data: light sources, camera angles, and the objects themselves. Each of these sources of data may be considered unique from each other, and the totality of the three sources of data may comprise a complete image. Without one of the sources of data, the image may not be complete. Each of the three sources of data may therefore be characterized as key spaces, wherein encrypting part of or the entirety of even one of these key spaces prevents the complete image from being viewed. Methods and apparatuses are provided for utilizing the concept of
(Continued)

encrypting at least a portion of at least one of the three key spaces in order to securely and/or privately transmit image data to subscribers.

16 Claims, 4 Drawing Sheets

(51) Int. Cl.
*H04N 1/44* (2006.01)
*H04N 21/234* (2011.01)
*H04L 29/08* (2006.01)

(58) Field of Classification Search
USPC ................ 380/210, 213, 214, 215, 216, 217
See application file for complete search history.

(56) References Cited

U.S. PATENT DOCUMENTS

| | | | |
|---|---|---|---|
| 7,957,530 B2* | 6/2011 | Lecomte et al. | 380/214 |
| 8,599,197 B1* | 12/2013 | Yu | G06T 17/20 |
| | | | 345/419 |
| 2001/0053222 A1* | 12/2001 | Wakao et al. | 380/43 |
| 2002/0085734 A1* | 7/2002 | Keeney et al. | 382/100 |
| 2003/0035478 A1 | 2/2003 | Taubman | |
| 2003/0208679 A1 | 11/2003 | Vazquez | |
| 2004/0174998 A1 | 9/2004 | Youatt | |
| 2004/0208382 A1* | 10/2004 | Gioia | G06T 9/007 |
| | | | 382/240 |
| 2005/0123136 A1* | 6/2005 | Shin et al. | 380/217 |
| 2007/0053431 A1 | 3/2007 | Cammas | |
| 2007/0064099 A1* | 3/2007 | Balter | G06T 9/00 |
| | | | 348/51 |
| 2008/0193027 A1* | 8/2008 | Gioia | G06T 9/001 |
| | | | 382/240 |
| 2008/0226068 A1* | 9/2008 | Dufaux et al. | 380/217 |
| 2008/0244002 A1 | 10/2008 | Yano | |
| 2010/0134490 A1* | 6/2010 | Corazza | G06T 17/20 |
| | | | 345/420 |
| 2010/0142621 A1* | 6/2010 | Lecomte et al. | 375/240.16 |
| 2011/0004912 A1 | 1/2011 | Teniou | |
| 2011/0064220 A1 | 3/2011 | Chen | |
| 2011/0194688 A1* | 8/2011 | Le Barz et al. | 380/217 |
| 2012/0082309 A1 | 4/2012 | Wen | |
| 2012/0229602 A1* | 9/2012 | Chen et al. | 348/43 |

OTHER PUBLICATIONS

Balter, Raphale, et al., "Scalable and Efficient Video Coding Using 3-D Modeling," IEEE Transactions on Multimedia, IEEE Service Center, Dec. 1, 2006, vol. 8, No. 6, pp. 1147-1155.
Stutz, Thomas, et al., "A Survey of H.264 AVC/SVC Encryption," IEEE Transactions on Circuits and Systems for Video Technology, IEEE Service Center, Mar. 1, 2012, vol. 22, No. 3, pp. 325-339.
Kim, Min-Su, et al., "Watermarking of 3D Irregular Meshes Based on Wavelet Multiresolution Analysis," Digital Watermarking Lecture Notes in Computer Science, Jan. 1, 2005, pp. 313-324.
Supplementary European Search Report mailed Oct. 21, 2015 in EP Patent Application No. 13847739, 11 pages.

* cited by examiner

DIGITAL BROADCAST METHODS USING SECURE MESHES AND WAVELETS

CROSS REFERENCE TO RELATED APPLICATIONS

This application claims the benefit of U.S. Provisional Patent Application No. 61/716,442, filed Oct. 19, 2012, and titled "DIGITAL BROADCAST METHODS USING SECURE MESHES AND WAVELETS," the disclosures of which are hereby incorporated by reference in their entirety and for all purposes.

BACKGROUND

Piracy in digital motion picture media is a common and pervasive problem plaguing many media distributors and producers. Millions of dollars are lost each year due to bootleg movies and other common methods for copying and redistributing. These efforts have been made even easier as most media has now become digital, and methods for copying and redistributing digital media are numerous and require fewer physical resources than copying their analog counterparts. In an effort to protect the rights of movie distributors and producers, physical and software constraints have been implemented to prevent the literal copying of digital media. Some efforts include encrypting the digital media, which often times prevents some or all of a digital product from being viewed without the proper encryption key. However, there are a number of limitations with current encryption methods, such that the costs in effort taken to perform the encryption may outweigh the losses prevented. It is desirable then to improve upon or generate new methods for securely managing digital media that may be both time and cost efficient.

SUMMARY

Methods and apparatuses are presented for securely providing digital streaming data to subscriber devices using encrypted wavelet meshes. In general, a recorded image may be subdivided into three sources of data: light sources, camera angles, and the objects themselves. Each of these sources of data may be considered unique from each other, and the totality of the three sources of data may comprise a complete image. Without one of the sources of data, or even some portions of one of the three sources of data, the image may not be complete.

In some embodiments, each of the three sources of data may be characterized as key spaces, wherein encrypting part of or the entirety of even one of these key spaces prevents the complete image from being viewed. In some embodiments, methods and apparatuses are provided for utilizing the concept of encrypting at least a portion of at least one of the three key spaces in order to securely and/or privately transmit image data to subscribers.

In some embodiments, a method is presented. The method may include receiving image data indicative of an image, isolating sections of the image into a plurality of image sub-components, converting the isolated sub-components into securely managed intermediate wavelets, generating a plurality of mesh components using the securely managed intermediate wavelets, merging the plurality of mesh components into a wavelet mesh data stream, and transmitting the wavelet mesh data stream to a target device if the target devices satisfies risk requirements.

In some embodiments, the method may further include determining rate and acceleration measurements of each of the isolated sections.

In some embodiments, the method may further include receiving information about the target device, the information specifying performance criteria to determine a level of performance of the target device.

In some embodiments, the method may further include obtaining historical or real-time preferences of a user associated with the target device. In some embodiments, the plurality of mesh components further uses the information about the target device and the historical or real-time user preferences.

In some embodiments, the method may further include generating unique mesh objects that allows for visually unique identification of the target device.

In some embodiments, the plurality of image sub-components includes light sources, objects, and camera angles.

In some embodiments, converting the isolated sub-components into securely managed intermediate wavelets comprises encrypting at least one of the sub-components into encrypted intermediate wavelets such that the image is distorted or un-viewable while the encrypted intermediate wavelets remain in an encrypted state.

In some embodiments, a system is presented. The system may include a server configured to receive image data indicative of an image. The system may also include a processor configured to: isolate sections of the image into a plurality of image sub-components; convert the isolated sub-components into securely managed intermediate wavelets; generate a plurality of mesh components using the securely managed intermediate wavelets; and merge the plurality of mesh components into a wavelet mesh data stream. The system may also include a transmitter configured to transmit the wavelet mesh data stream to a target device if the target devices satisfies risk requirements.

In some embodiments, a non-transitory computer-readable medium is presented. The non-transitory computer-readable medium may store instructions that, when executed, cause a computing device to: receive image data indicative of an image; isolate sections of an image into a plurality of image sub-components; convert the isolated sub-components into securely managed intermediate wavelets; generate a plurality of mesh components using the securely managed intermediate wavelets; merge the plurality of mesh components into a wavelet mesh data stream; and transmit the wavelet mesh data stream to a target device if the target devices satisfies risk requirements.

In some embodiments a method of a target device is presented. The method may include receiving, at the target device, secure wavelet mesh data after the targeting device satisfies risk requirements. The method may also include receiving an encryption key associated with the secure wavelet mesh data, decrypting at least a portion of the secure wavelet mesh data using the encryption key, and displaying the wavelet mesh data in one or more images.

In some embodiments, the method of the target device may also include: sending, to a computer server, historical and real-time preferences of a user associated with the target device; storing the wavelet mesh data according to time requirements for each wavelet mesh; storing unique device specific wavelets according to the preferences of the user; and modifying the displayed wavelet mesh data according to the preferences of the user.

In some embodiments, the method of the target device may also include the secure wavelet mesh data comprising a plurality of sub-components that, when combined, generate one or more images, wherein at least one of the plurality of sub-components is encrypted such that the one or more images is distorted or un-viewable while the at least one of the plurality of sub-components remains in an encrypted state.

In some embodiments, decrypting at least a portion of the secure wavelet mesh data in the method of the target device may include decrypting the at least one encrypted sub-components using the encryption key.

In some embodiments, the plurality of sub-components in the method of the target device includes light sources, objects, and camera angles.

In some embodiments, another system is presented. The system may include a receiver configured to: receive secure wavelet mesh data after the system satisfies risk requirements; and receive an encryption key associated with the secure wavelet mesh data. The system may also include a processor configured to decrypt at least a portion of the secure wavelet mesh data using the encryption key; and a display configured to display the wavelet mesh data in one or more images.

In some embodiments, another non-transitory computer-readable medium is presented. The non-transitory computer-readable medium may store instructions that, when executed, cause a computing device to: receive secure wavelet mesh data after the system satisfies risk requirements; receive an encryption key associated with the secure wavelet mesh data; decrypt at least a portion of the secure wavelet mesh data using the encryption key; and display the wavelet mesh data in one or more images.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Piracy in digital motion picture media is a common and pervasive problem plaguing many media distributors and producers. Millions of dollars are lost each year due to bootleg movies and other common methods for copying and redistributing. These efforts have been made even easier as most media has now become digital, and methods for copying and redistributing digital media are numerous and require fewer physical resources than copying their analog counterparts. In an effort to protect the rights of movie distributors and producers, physical and software constraints have been implemented to prevent the literal copying of digital media. Some efforts include encrypting the digital media, which often times prevents some or all of a digital product from being viewed without the proper encryption key. However, there are a number of limitations with current encryption methods, such that the costs in effort taken to perform the encryption may outweigh the losses prevented. For example, a comprehensive encryption of a single movie may involve encrypting the entirety of each and every frame of the digital movie, which may be extremely memory and time intensive. On the other hand, distributors may include a single access code at the beginning of the media file, requiring a single password to unlock. However, this technique may be easily cracked, as just a single password is needed, and there exist a number of well-known techniques available for obtaining the cracked code. It is desirable then to improve upon or generate new methods for securely managing digital media that may be both time and cost efficient.

Methods and systems of the present disclosures include novel methods for providing securely managed digital media to consumers. The techniques presented herein include encrypting individual frames of digital motion pictures using 3-dimensional wavelet meshes, according to some embodiments. As used herein, a "mesh" or a "wavelet mesh" may refer generally to a 3-dimensional shape representing at least a portion of a whole object, e.g. a chair, a person, a car, a face, etc. A mesh may include a set of vertices, or points, dots, or corners, defined according to some 3-dimensional space. The mesh may also include a set of connections describing the relationships between each of the vertices. For example, the connections between the vertices may all be straight lines connecting all of the vertices. In some embodiments, weighted meshes may be used. Weighted meshes may refer to a data shape comprising a series of vertices, or dots, with weights or codes used to describe the relationship between each pair of vertices. The weights or codes may signal a type of line connecting the two vertices. For example, the "line" between two vertices may be a straight line, convex curve, concave curve, squiggly/wavy line, etc. The value of the code may represent what type of line connects the two vertices. As a simple example, a code of "1" may signal a straight line between two points, while a code of "2" may signal a convex curve between two points. In some embodiments, a type of color and/or gradient/shade may be included in the weight or code. For example, a code of "1" may signal a white straight line between two points, while a code of "2" may signal a blue straight line between two points, while a code of "3" may signal a clear or transparent line between two points. Thus, when the weighted mesh data is processed, the weights may signal what type of curve or line should connect each pair of vertices using the weighted code, and regenerate a 3-dimensional object accordingly. In general, it may be readily apparent to those with skill in the art that any object in a recorded image may be regenerated or represented by a series of meshes or weighted meshes.

In some embodiments, at least a portion of the weights and/or vertices of the meshes in an image may be encrypted, such that a portion of the entire image may not be viewable or may be distorted while the meshes are in an encrypted state. Thus, for example, only a subscriber with the proper key may be able to decrypt the mesh and regenerate the images. In some embodiments, each image in a series of images, such as a movie, may be sub-divided into various mutually exclusive sub-components, where one or merely some of the sub-components are encrypted rather than the entire image, thus saving time and memory. In some embodiments, the relationships between the mutually exclusive sub-components may be encrypted. In other embodiments, manipulating the sub-components, meshes, and/or relationships between the sub-components may be available for purposes other than encryption, such as for privacy or research purposes, and embodiments are not so limited. These methods and concepts of the present disclosures may be discussed in more detail herein.

Figure 1:
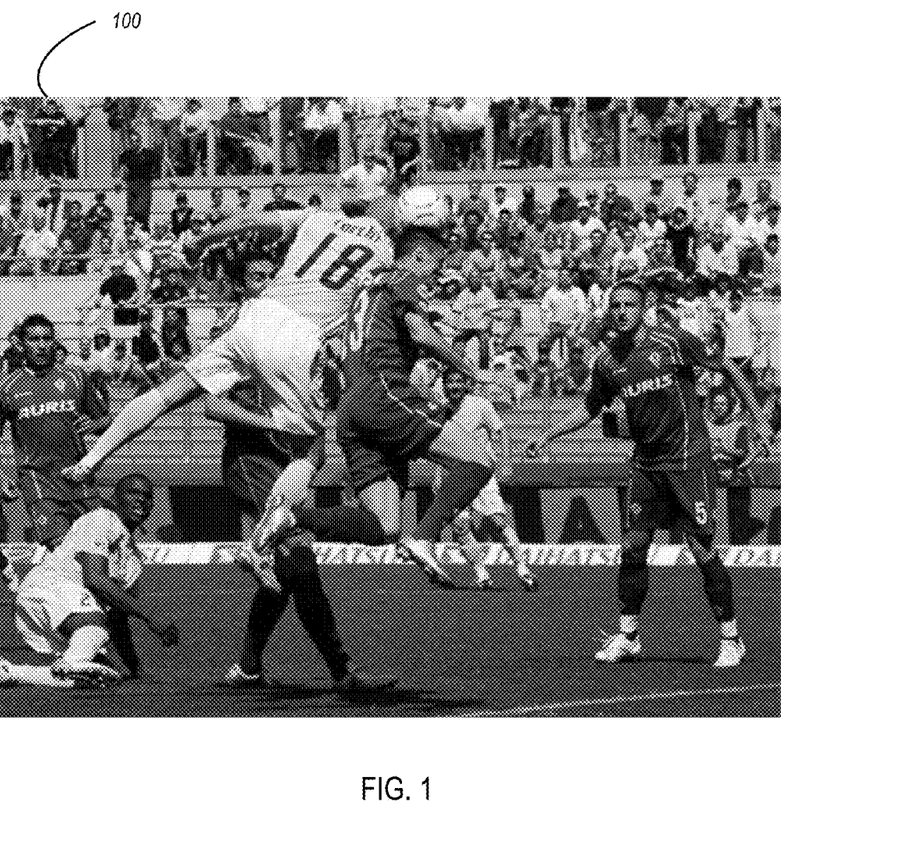
FIG. 1 is an exemplary image of a soccer game that may be processed according to aspects of the present disclosure.

Referring to FIG. 1, an exemplary image 100 of a soccer game is displayed. While this image 100 is a 2-dimensional recorded image, techniques are known in the art to convert the image into a series of 3-dimensional wavelet meshes. That is, each object in the image, e.g., the soccer players, the ball, the pitch, the fans, the stands, etc., may be converted into a series of 3-dimensional wavelet meshes. In other cases, stereo cameras may be used to generate images already possessing depth properties, allowing for an easier conversion to 3-dimensional wavelet meshes. In other cases, movies or other motion pictures recorded in 3-dimensions may also allow for easier conversion to 3-dimensional wavelet meshes. In other cases, two or more images recording the same objects but with camera angles from different angles or perspectives, even if slight, can be used to reproduce the objects as 3-dimensional wavelet meshes, according to known techniques in the art. In any case, once an image is reproduced as a series of wavelet meshes, the properties of any or all of the meshes may be manipulated, and in some cases may be manipulated for security or privacy purposes. For example, the weights or codes between the vertices of the meshes comprising the soccer player wearing #18 may be altered, such that, instead of generating white and light-blue colored meshes for his uniform, the weights may be changed to generate black meshes. In this way, an object in the image, e.g. the soccer player #18, may be "blacked out" and may appear simply as a silhouette. This concept may then be applied to altering an image for security or privacy purposes. For example, an encryption algorithm applied to the image 100 may alter the weights or codes of some or all of the meshes, distorting the objects' colors, or in some cases, turning the objects all black. Only with the proper encryption key may one decrypt the encryption on the meshes and convert the image to its original view. Similarly, this technique may be used for privacy purposes. For example, it may be desirable to hide or obfuscate certain portions of an image. For example, if the image 100 were an image of teenage girls playing soccer, one may desire to block out the faces of girls' images for privacy concerns when viewed by others. As another example, it may be desirable to track movements of a single player in the soccer game, and it may not be necessary to view everybody's faces. Alternatively, the identities of some players may be hidden from view for security and/or privacy concerns. The techniques discussed herein may enable a producer of the digital media to manipulate portions of the images accordingly.

Because only certain objects in the image may be of importance or a focus, it may not be necessary or as essential to encrypt all objects in the image. Using techniques of the present disclosures may allow for just portions of the image to be encrypted and/or obfuscated, which reduces the amount of encryption being performed on each image. In this way, time and memory resources may be reduced.

In some embodiments, more sophisticated methods for encryption/obfuscation may be employed. For example, an image, e.g. image 100, may be divided into three sources of data: light sources, including lights reflecting off of objects, the camera angle, and the objects themselves. These three sources of data, which may be referred to herein as sub-components of the image, may be manipulated for encryption and/or privacy purposes as well. Because these sub-components may be used individually or in combination for encryption, these sub-components may also be referred to as key spaces. A brief explanation of the light sources and camera angles will be described.

Because the image is converted into a 3-dimensional view, light sources may be reproduced to simulate how all the objects in the image are viewed. For example, in image 100, while not shown, it can be reasoned that the sun provides the light in the image, and may be positioned approximately in above and slightly to the left, based on the positions of the shadows. The image 100 may therefore be converted into a 3-dimensional image by including a sun-like light source out of view of the image but approximately above and slightly to the left of center of the image. Standard ray-tracing emanating from the light source may be applied to the image to create the same color effects, brightness, reflections, and shadows as seen in image 100.

Similarly, because the objects in the image are converted into 3-dimensional space, one or more camera angles may be generated and used to present the view of the image as observed. For example, in image 100, a camera angle representing the view as shown may be reproduced. Alternatively, another camera angle may be generated, e.g., a camera angle rotated 90 degrees around the image may be generated. This may be possible because the objects in the image have now been converted into 3-dimensional wavelet meshes, so views of the objects from multiple angles may be possible. However, because the 3-dimensional image may derive its data from a 2-dimensional view in some cases, not all of the angles of the 3-dimensional image may contain all the information sufficient to view the image fully. For example, it is not known with just the data from image 100 what player #18's face looks like, since only the back of his head is shown here. If the camera angle were rotated 180 degrees therefore, probably only a partially complete picture may be viewable, if that.

In some embodiments, at least some portions of these key spaces, e.g., objects, light sources, and/or camera angles of the images, may be encrypted, such that a user may be unable to view the entire image without obtaining one or more decryption keys. For example, one or more light sources of image 100 may be encrypted, such that, while in the encrypted state, image 100 would have no light emanating from said light source. In this way, even though all of the objects are properly generated and the camera angle is properly in place, the image is still not viewable because no light would shine on the objects. Only with the proper decryption key may one be able to enable the light source and thus view the image. Similarly, in another example, one or more objects may be manipulated or even erased via an encryption algorithm. Thus, even though the light source(s) may be properly emanating light and the camera angle is properly in place, the image is still not properly viewable because one or more of the objects is either distorted or missing entirely. Moreover, in another example, the camera angle may be changed via an encryption algorithm. Without the proper decryption key, the camera angle may be rotated 180 degrees, for example, thereby showing objects with light sources lacking information sufficient to properly view the image, even though the objects and the light sources are still present. Thus, sub-dividing the image into these various sub-components and encrypting and/or manipulating just one (or just a portion of one) of the sub-components may render the image distorted or un-viewable. Memory and processing power may therefore be reduced while still providing a securely managed image.

In some embodiments, the properties of the light emanating from the light sources may be changed as a form of encryption or obfuscation. For example, some or all of the rays of light emanating from one or more light sources may be changed to generate "black" light, rather than normal "white" light that we are normally accustomed to. In this way, whatever objects the "black" light hits will not reflect the normal colors, but instead may appear blacked out or distorted in some other way. Thus, rather than eliminating, removing, or encrypting any of the objects, light sources, or camera angles, all three data sources may be kept intact while only the light properties from the light sources may be encrypted with this technique. An example decryption for this technique may include a decryption key configured to revert the light properties back to their original form.

In some embodiments, the boundaries of the objects may be manipulated in order to distort or render the image un-viewable. For example, the code or weight of the wavelet meshes of one or more objects may be changed to have a transparent or clear property, instead of their original color. For example, referring to the soccer player #18 in image 100, instead of the wavelet meshes being coded to reflect white or light blue when the light from the light sources hit the player's uniform, the weights may be altered to be transparent, e.g. to allow the light to pass through the meshes of player #18. Therefore, the image may not display player #18 and may show perhaps just an empty silhouette, or in the event additional data is available showing what is behind player #18, then player #18 may simply be removed from the picture. In some embodiments, the weights of the wavelet meshes may be altered to allow for only a degree of light to reflect off the object, achieving in effect a sort of translucent state of the object.

In some embodiments, additional objects may be added to the image as a form of encryption or obfuscation. For example, hundreds of tiny rain droplets may be added to all of the images to distort or block the view of the image. The decryption method here may then be removing the rain droplets or changing the boundaries of the rain droplets to be transparent, such that when the light from the light sources reach the rain droplets, the light will simply pass through to the normal objects. Since there are numerous rain droplets, the decryption method may involve a single decryption key to remove all of the droplets, or multiple decryption stages to remove one or portions of the droplets at a time. Obviously, the more levels of decryption would increase the complexity of decrypting the entire image. Similarly, certain objects or just portions of the objects may simply be distorted, e.g., warped, twisted, greyed-out, made fuzzy, etc., using similar techniques.

In some embodiments, even more sophisticated encryption schemes may be applied on the sources of data in each image. For example, principles of group theory may be applied to encrypt the relationships between the three sources of data. The three sources of data may be divided into a plurality of groups such that the objects, light sources, and camera angles in each group may be allowed to view or interact with only other objects, light sources, and camera angles in the same group. For example, the light directed toward the fans in the stands of image 100 may be grouped with the objects of the soccer players in the foreground, while the light directed toward the soccer players may be grouped with the object of the soccer pitch. As another example, a particular camera angle may be grouped with light or objects belonging to a different camera angle, for example the light intended to show player #18's back is grouped with a camera angle that is rotated to view player #18's face. Of course, if the objects, light sources, and camera angles refer to different regions or perspectives of the image, then a likely result is that no image will be displayed simply by following the rules specified in each group. In the aforementioned examples, the light directed at the fans in the stands would display no result, since the fans in the stands are not a part of that group. Similarly, the soccer players would not be visible either, since the only light belonging to the group with the soccer players includes light directed at the pitch. The knowledge of what objects, light sources, and camera angles belong to what groups, and the sets of rules associated with what groups, may be specified and known only to a service provider providing the digital media (or similarly known only to the producer of the media, or in general the entity controlling the encryption), thereby creating a type of encryption and obfuscation. Therefore, a key or series of keys that disables these sets of rules may serve as a form of decryption on the image. In this way, all of the data comprising the image, e.g., the objects, light sources, and camera angles, may be provided and available to a viewer or subscriber, as the sources of data themselves do not need to be manipulated or altered. Yet, this additional set of encrypted rules defining the relationships between the data sources and how the data sources interact may be all that is needed to sufficiently distort or render the image un-viewable while in the encrypted state.

In some embodiments, the sound of a motion picture may also be encrypted using analogous methods described herein. For example, in some techniques for encoding sound, optical properties may be applied to represent the sound digitally. These optical properties may be encrypted analogously according to the methods presented herein.

In some embodiments, a combination of some or all of the techniques presented herein may be employed as an even more sophisticated system of encryption or obfuscation. It may be noted that a number of the techniques presented herein are not mutually exclusive of each other, and that many of the techniques may produce the same or similar looking distorted effects of an image, e.g. more than one of the aforementioned techniques may produce a blacked-out image. Because many of the techniques may produce the same effects, employing a varied combination of them may make cracking the encryption techniques even tougher, since the would-be hacker may not know what portions of the data he must target to break the encryption.

Other uses employing the techniques herein are possible. For example, ads in an image may be altered, modified, or even substituted out for other ads. For example, the banners in image 100 may be blacked out, made invisible, or substituted for different types of ads using the techniques described herein. As another example, these techniques may be used to isolate objects in one or more images for research or investigative purposes. For example, a security camera stationed in one place and configured to not move may record many objects in the exact same positions, which may be blacked out or removed in order to isolate only the moving objects or people. Similarly, other objects may be modified, not necessarily for privacy or security purposes. A viewer who utilizes these techniques may simply want to alter his or her viewing experience. For example, the uniforms of the soccer players in image 100 may be altered to have stripes on them, or the faces of the players may be modified to look like monsters or aliens.

Methods presented herein may be used to improve data processing for high resolution images and for privacy and/or security purposes. For example, by obfuscating at least some portions of the images, a device processing the image may need to process only part of the image, saving time and resources. For example, images comprising 4 k, 6 k, or 8 k bytes each may benefit from methods presented herein to reduce processing resources needed to display each image.

Figure 2:
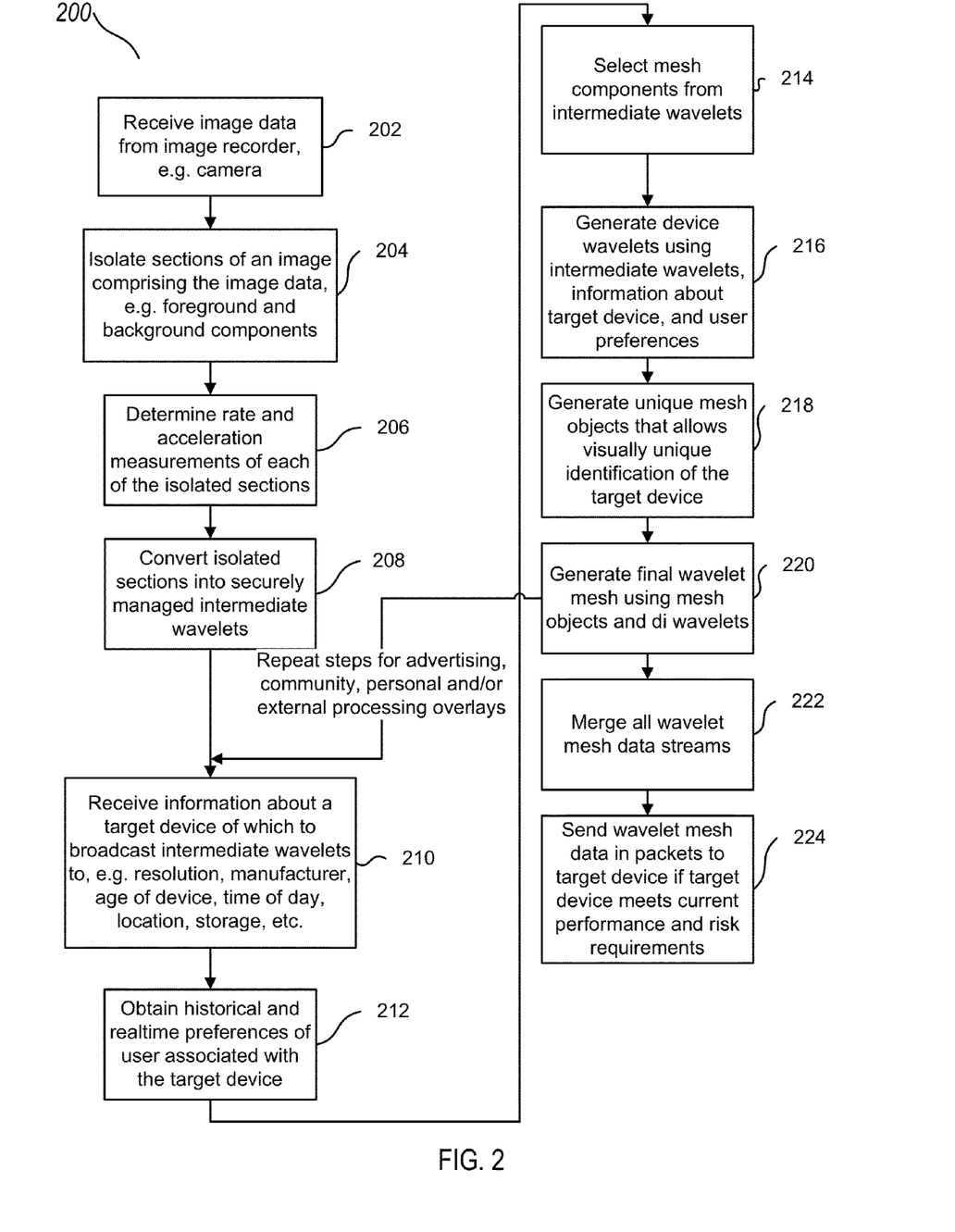
FIG. 2 is an example process flow of a server according to some embodiments.

Referring to FIG. 2, an exemplary process flow 200 for some embodiments is presented. Process flow 200 may be implemented by a server of a service provider, or an entity that may control the distribution of the images using security methods according to the disclosures herein. The service provider or distributor may control the encryption processes and/or the distribution of the digital media being encoded with any of the encryption methods presented herein. Additionally, the service provider may control the means for a subscriber to alter the digital media according to any of the techniques described herein.

At block 202, a server according to some embodiments may receive image data from an image recorder. Examples of image recorders may be a high resolution camera, a video recorder, a mobile phone with a camera, etc. Obviously, multiple images may be received, but one image is described here for clarity. At block 204, sections of the image may be isolated according to a set of image criteria. For example, sections of the image in the foreground may be identified and isolated from sections of the image in the background. At block 206, acceleration and other rate measurements may be taken of each of the isolated sections. One may note then that the rate and acceleration measurements for each section may vary, e.g. the measurements for the background may be much slower than measurements in the foreground. In some embodiments, image data at block 202 may be received already having preprocessed the steps in blocks 204 and 206.

At block 208, the isolated sections may be converted into securely managed intermediate wavelets. The intermediate wavelets may be non-proprietary wavelets, and may therefore allow for the data in the image to be encrypted or modified with techniques described herein. The wavelets may be securely managed according to the any of the security techniques discussed herein. In some embodiments, the isolated sections may be received already converted into intermediate wavelets, but they may be processed to have securely managed properties according to the methods described herein at the service provider or distributor.

At block 210, information about a target device of which to broadcast the intermediate wavelets to, may be received. Exemplary target devices may include a mobile device, a personal computer, a cable box, a satellite dish subscriber, etc. Exemplary information about the target device may include resolution, manufacturer, age of the device, time of day, location, storage, etc. Such information may be used to tailor the intermediate wavelets to specific wavelets for the target device, which is explained more below. At block 212, historical and real-time preferences of a user associated with the target device may also be obtained. Such preferences may be used to tailor the intermediate wavelets to specific wavelets for the target device, which is explained more below.

At block 214, mesh components may be generated or selected using the intermediate wavelets. This process may be implemented according to known techniques in the art for generating meshes. At block 216, unique device wavelets may be generated for the target device. The unique device wavelets may be based on the intermediate wavelets, the information about the target device, and the user preferences according to the previous blocks 208, 210, and 212.

At block 218, using the unique device wavelets and the meshes generated by the intermediate wavelets, unique mesh objects may be generated that allows for visually unique identification of the target device. At block 220, a final wavelet mesh may be generated using the mesh objects and di wavelets. The process described within steps 210 to 220 may be repeated for various types of processing overlays. For example, these steps may be repeated for advertising, community, personal and/or external processing overlays. Once each set of unique mesh objects are generated, at block 222, all of the wavelet meshes may be merged into a single data stream for transmission to the target device. Therefore, at block 224, the wavelet mesh data may be sent to the target device in packets, if the target device meets current performance and risk requirements.

In some embodiments, encryption and/or obfuscation techniques described above may be used to embed security mechanisms into the wavelet meshes of each image. The target device may be found to satisfy risk requirements, and thus a key or series of keys may also be sent to the target device to decode the encrypted mesh wavelets. In some embodiments, one or more security checks may be included at any or every stage involving an interaction with the target device. For example, these steps may be repeated to alter the properties of the securely managed wavelets, based on a query or command from the target device (or subscriber). Security questions and/or automatic security checks can be included at these stages in order to properly authenticate the user.

Figure 3:
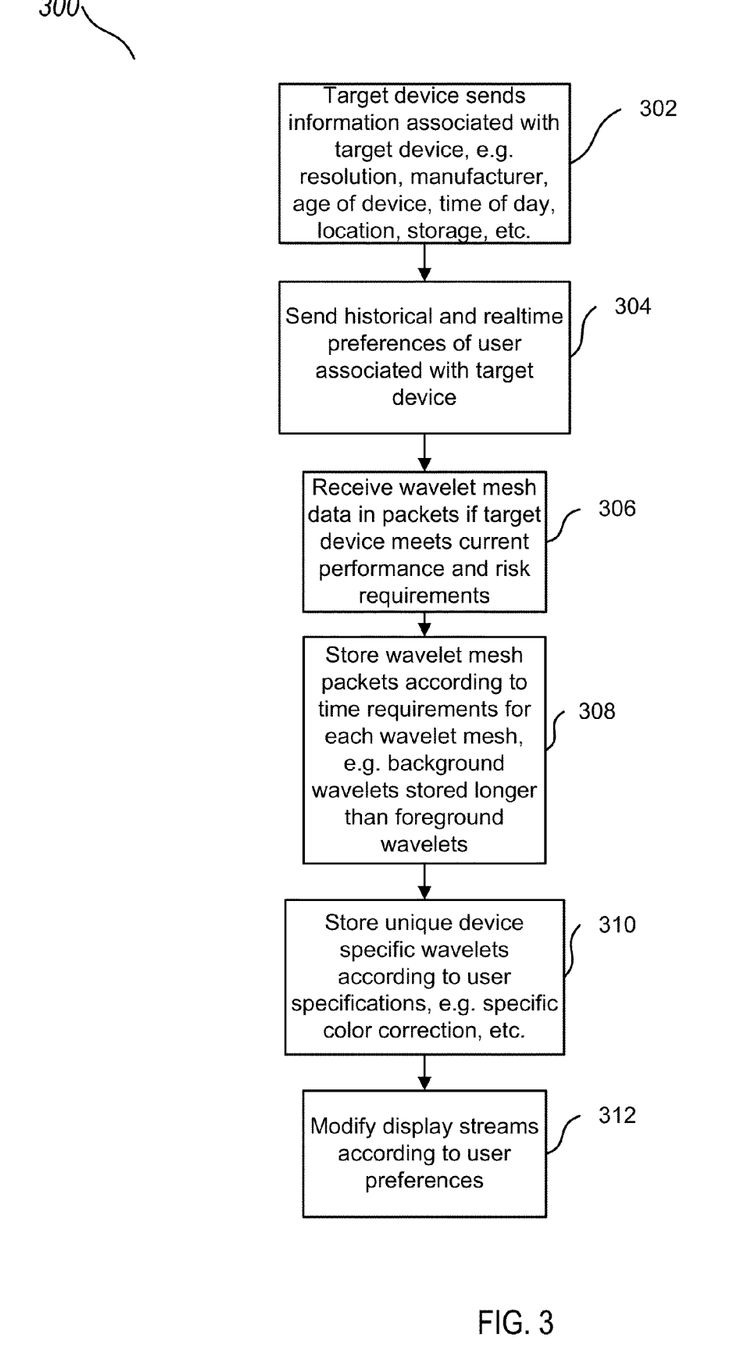
FIG. 3 is an example process flow of a target device according to some embodiments.

Referring to FIG. 3, flowchart 300 may illustrate an exemplary process flow of a target device, according to some embodiments. At block 302, the target device may send information associated with the target device to a server or entity controlling the data stream of images. At block 304, the target device may also send historical and real-time preferences of a user associated with the target device.

At block 306, wavelet mesh data may be received in packets. The wavelet mesh data may have incorporated the historical and real-time user preferences, as well as the information associated with the target device, as sent in blocks 302 and 304. The target device may need to satisfy current performance and risk requirements before receiving the data packets.

At block 308, the wavelet mesh packets may be stored according to time requirements for each wavelet mesh. For example, the background wavelets may be stored for a longer period of time than the foreground wavelets. At block 310, unique device specific wavelets may be stored as well, according to user specifications. Example specifications may include a specific color correction, contrast, sharpness, etc.

At block 312, the user may have the option of modifying the images from the data packets according to user preferences. Here, the user may voluntarily use any of the security and/or obfuscation techniques described herein. For example, the user may want to focus only on certain faces or objects in the images, and thus may elect to "black-out" the remaining images. Alternatively, the user may provide a localized level of encryption to prevent others from viewing without a specific code.

In some embodiments, the user of the target device may possess the ability to modify the image independent of the service provider. For example, the user may be a producer and may be the owner of the copyrighted digital media. In general, completing the techniques presented herein may require multiple sources, e.g. film recorder, editor, graphics designer, service provider, distributor, etc., and embodiments are not so limited.

Figure 4:
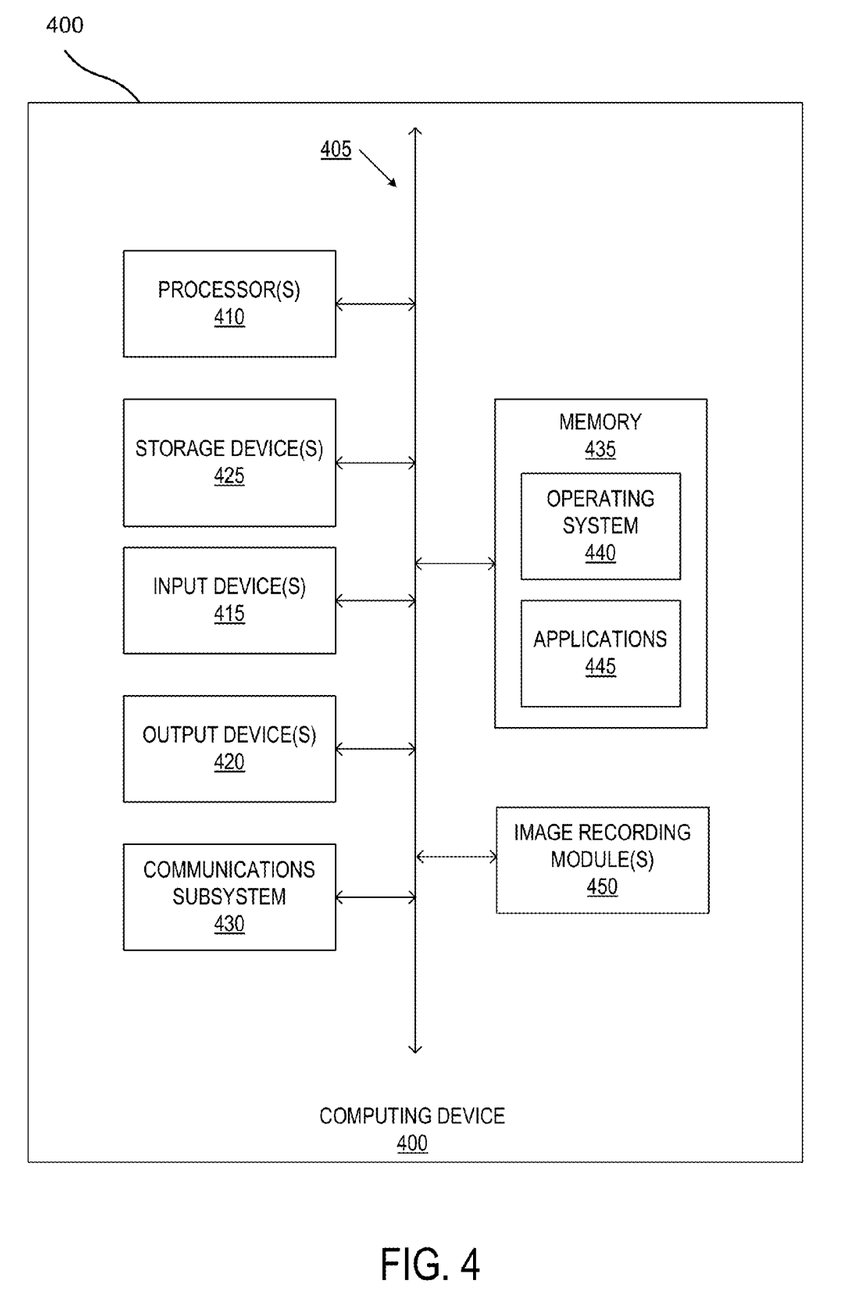
FIG. 4 is an example computer system according to some embodiments.

Having described multiple aspects of providing security to data streaming using wavelets and meshes, an example of a computing system in which various aspects of the disclosure may be implemented will now be described with respect to FIG. 4. According to one or more aspects, a computer system as illustrated in FIG. 4 may be incorporated as part of a computing device, which may implement, perform, and/or execute any and/or all of the features, methods, and/or method steps described herein. For example, computer system 400 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In other examples, computer system 400 may represent some of the components of a system housed within a base vehicle platform. In some embodiments, the system 400 is configured to implement any of the methods described above. FIG. 4 provides a schematic illustration of one embodiment of a computer system 400 that can perform the methods provided by various other embodiments, as described herein, and/or can function as the host computer system, a remote kiosk/terminal, a point-of-sale device, a mobile device, a set-top box, and/or a computer system. FIG. 4 is meant only to provide a generalized illustration of various components, any and/or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a camera, wireless receivers, wireless sensors, wired sensors, a mouse, a keyboard and/or the like; and one or more output devices 420, which can include without limitation a display unit, a printer and/or the like. In some embodiments, the one or more processor 410 may be configured to perform a subset or all of the functions described above with respect to FIGS. 1, 2 and 3. The processor 410 may comprise a general processor and/or application processor, for example. In some embodiments, the processor is integrated into an element that processes visual tracking device inputs and wireless sensor inputs.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 400 might also include a communications subsystem 430, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 430 may permit data to be exchanged with a network (such as the network described below, to name one example), other computer systems, and/or any other devices described herein. In many embodiments, the computer system 400 will further comprise a non-transitory working memory 435, which can include a RAM or ROM device, as described above. Also, image recording module(s) 450 may be included to record images. In other cases, input device(s) 415 may receive the image data, and output device(s) 420 may transmit the image data to other devices.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 1, 2 and 3, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processor(s) 410 to perform one or more procedures of the methods described herein, for example methods described with respect to FIGS. 1, 2 and 3.

The terms "machine-readable medium," "computer-readable medium," and "computer program product," as used herein, refer to any medium that participates in providing data that causes a machine to operate in a specific fashion. In an embodiment implemented using the computer system 400, various computer-readable media might be involved in providing instructions/code to processor(s) 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire and fiber optics, including the wires that comprise the bus 405, as well as the various components of the communications subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 410 retrieves and executes the instructions. The instructions received by the working memory 435 may optionally be stored on a non-transitory storage device 425 either before or after execution by the processor(s) 410. Memory 435 may contain at least one database according to any of the databases methods described herein. Memory 435 may thus store any of the values discussed in any of the present disclosures.

The methods described in FIGS. 1, 2 and 3 may be implemented by various blocks in FIG. 4. For example, processor 410 may be configured to perform any of the functions of blocks in diagram 400. Storage device 425 may be configured to store an intermediate result, such as a globally unique attribute or locally unique attribute discussed within any of blocks mentioned herein. Storage device 425 may also contain a database consistent with any of the present disclosures. The memory 435 may similarly be configured to record signals, representation of signals, or database values necessary to perform any of the functions described in any of the blocks mentioned herein. Results that may need to be stored in a temporary or volatile memory, such as RAM, may also be included in memory 435, and may include any intermediate result similar to what may be stored in storage device 425. Input device 415 may be configured to receive wireless signals from satellites and/or base stations according to the present disclosures described herein. Output device 420 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method comprising:
receiving, by a server, image data indicative of an image;
isolating, by the server, sections of the image into a plurality of image sub-components, wherein the plurality of image sub-components includes light sources and camera angles;
converting, by the server, the isolated image sub-components into securely managed intermediate wavelets;
generating, by the server, a plurality of wavelet mesh components using the securely managed intermediate wavelets, each wavelet mesh component representing a 3-dimensional shape that is defined by vertices and connections between the vertices;
merging, by the server, the plurality of wavelet mesh components into a wavelet mesh data stream; and
transmitting, using the server and a transmitter, the wavelet mesh data stream to a target device if the target device satisfies risk requirements,
wherein converting the isolated image sub-components into securely managed intermediate wavelets comprises encrypting a portion of the intermediate wavelets corresponding to the light sources or the camera angles to form encrypted intermediate wavelets, wherein a light source or a camera angle is changed or removed in the encrypted intermediate wavelets such that at least a portion of the image generated on the target device from the wavelet mesh data stream is distorted or unviewable while the encrypted intermediate wavelets remain in an encrypted state.

2. The method of claim 1, further comprising:
determining, by the server, rate and acceleration measurements of each of the isolated sections.

3. The method of claim 1, further comprising:
receiving, by the server, information about the target device, the information specifying performance criteria to determine a level of performance of the target device.

4. The method of claim 1, further comprising:
obtaining, by the server, historical or real-time preferences of a user associated with the target device.

5. The method of claim 1, wherein generating the plurality of wavelet mesh components further uses information about the target device and historical or real-time user preferences.

6. The method of claim 1, further comprising:
generating, by the server, unique mesh objects that allow for visually unique identification of the target device.

7. The method of claim 1 wherein generating the plurality of wavelet mesh components comprises using information about the target device to generate the plurality of wavelet mesh components.

8. The method of claim 1 wherein converting the isolated sub-components into securely managed intermediate wavelets further comprises encrypting the vertices, or the weights or codes of connections between the vertices in at least one of the sub-components to form the encrypted intermediate wavelets.

9. The method of claim 1 further comprising:
receiving, by the target device, the wavelet data stream;
decrypting, with an encryption key in the target device, vertices or weights in the received wavelet data stream; and
displaying, the image on the target device, wherein the at least the portion of the image is not obscured or unviewable.

10. The method of claim 1 wherein generating the plurality of wavelet mesh components comprises using user preferences to determine which vertices, or weights or codes of connections between the vertices to encrypt.

11. A system comprising:
a server comprising a processor and a computer readable medium coupled to the processor, the computer readable medium comprising code, executable by the processor to cause the processor to
receive image data indicative of an image;
isolate sections of the image into a plurality of image sub-components, wherein the plurality of image sub-components includes light sources and camera angles;
convert the isolated sub-components into securely managed intermediate wavelets;
generate a plurality of wavelet mesh components using the securely managed intermediate wavelets, each wavelet mesh component representing a 3-dimensional shape that is defined by vertices and connections between the vertices;
merge the plurality of wavelet mesh components into a wavelet mesh data stream; and
cause a transmitter to transmit the wavelet mesh data stream to a target device if the target device satisfies risk requirements,
wherein computer readable medium further comprises code to cause the processor to convert the isolated image sub-components into securely managed intermediate wavelets by encrypting a portion of the intermediate wavelets corresponding to the light sources or the camera angles to form encrypted intermediate wavelets, wherein a light source or a camera angle is changed or removed in the encrypted intermediate wavelets such that at least a portion of the image generated on the target device from the wavelet mesh data stream is distorted or unviewable while the encrypted intermediate wavelets remain in an encrypted state.

12. A non-transitory computer-readable medium storing instructions that, when executed, cause a computing device to:
receive image data indicative of an image;
isolate sections of an image into a plurality of image sub-components, wherein the plurality of image sub-components includes light sources and camera angles;
convert the isolated sub-components into securely managed intermediate wavelets;
generate a plurality of wavelet mesh components using the securely managed intermediate wavelets, each wavelet mesh component representing a 3-dimensional shape that is defined by vertices and connections between the vertices;
merge the plurality of wavelet mesh components into a wavelet mesh data stream; and
cause a transmitter to transmit the wavelet mesh data stream to a target device if the target device satisfies risk requirements, wherein the computer readable medium further comprises code to cause the processor to convert the isolated image sub-components into securely managed intermediate wavelets by encrypting a portion of the intermediate wavelets corresponding to the light sources or the camera angles to form encrypted intermediate wavelets, wherein a light source or a camera angle is changed or removed in the encrypted intermediate wavelets such that at least a portion of the image generated on the target device from the wavelet mesh data stream is distorted or unviewable while the encrypted intermediate wavelets remain in an encrypted state.

13. A method comprising:

receiving, at a target device, secure wavelet mesh data after the target device satisfies risk requirements, the secure wavelet mesh data comprising a plurality of wavelet mesh components, each wavelet mesh component representing a 3-dimensional shape that is defined by vertices and connections between the vertices, wherein the secure wavelet mesh data comprises the wavelet mesh components derived from a plurality of sub-components that, when combined, generate one or more images, wherein the plurality of sub-components includes light sources, objects and camera angles, wherein a portion of intermediate wavelets corresponding to the light sources or the camera angles is encrypted to change a light source or a camera angle, respectively, wherein a portion of the objects has encrypted vertices, or encrypted weights or codes of connections between the vertices such that at least a portion of the one or more images is distorted or unviewable when the at least one of the plurality of sub-components remains in an encrypted state;

receiving, by the target device, an encryption key associated with the secure wavelet mesh data;

decrypting, by the target device, the encrypted vertices, or the encrypted weights or codes of the connections between the vertices in the secure wavelet mesh data using the encryption key; and after decrypting, displaying, by the target device, the one or more images derived from the secure wavelet mesh data, wherein the at least the portion of the one or more images is not distorted or unviewable on the target device.

14. The method of claim 13, further comprising:

sending, to a computer server, historical and real-time preferences of a user associated with the target device;

storing the secure wavelet mesh data according to time requirements for each wavelet mesh component;

storing unique device specific wavelets according to the preferences of the user; and modifying the displayed secure wavelet mesh data according to the preferences of the user.

15. A non-transitory computer-readable medium storing instructions that, when executed, cause a computing device to:

receive secure wavelet mesh data after the computing device satisfies risk requirements, the secure wavelet mesh data comprising a plurality of wavelet mesh components, each wavelet mesh component representing a 3-dimensional shape that is defined by vertices and connections between the vertices, wherein the secure wavelet mesh data comprises a plurality of sub-components that, when combined, generate one or more images, wherein the plurality of sub-components includes light sources, objects and camera angles, wherein a portion of intermediate wavelets corresponding to the light sources or the camera angles is encrypted to change a light source or a camera angle, respectively, wherein a portion of the objects has encrypted vertices, or encrypted weights or codes of connections between the vertices such that at least a portion of the one or more images is distorted or unviewable when the at least one of the plurality of sub-components remains in an encrypted state;

receive an encryption key associated with the secure wavelet mesh data;

decrypt the encrypted vertices, or the encrypted weights or codes of the connections between the vertices in at least a portion of the secure wavelet mesh data using the encryption key; and display the wavelet mesh data in one or more images derived from the secure wavelet mesh data, wherein the at least the portion of the one or more images is not distorted or unviewable on the target device.

16. A target device comprising:

a processor; and a computer readable medium, the computer readable medium comprising code, executable by the processor, for implementing a method comprising:

receiving secure wavelet mesh data after the target device satisfies risk requirements, the secure wavelet mesh data comprising a plurality of wavelet mesh components, each wavelet mesh component representing a 3-dimensional shape that is defined by vertices and connections between the vertices, wherein the secure wavelet mesh data comprises the wavelet mesh components derived from a plurality of sub-components that, when combined, generate one or more images, wherein the plurality of sub-components includes light sources, objects and camera angles, wherein a portion of the intermediate wavelets corresponding to the light sources or the camera angles is encrypted to change a light source or a camera angle, respectively, wherein a portion of the objects has encrypted vertices, or encrypted weights or codes of connections between the vertices such that at least a portion of the one or more images is distorted or unviewable when the at least one of the plurality of sub-components remains in an encrypted state;

receiving an encryption key associated with the secure wavelet mesh data;

decrypting the encrypted vertices, or weights or codes of the connections between the vertices in the secure wavelet mesh data using the encryption key; and after decrypting, displaying the one or more images derived from the secure wavelet mesh data, wherein the at least the portion of the one or more images is not distorted or unviewable on the target device.

* * * * *